United States Patent
Fukatsu

(10) Patent No.: US 9,692,081 B2
(45) Date of Patent: Jun. 27, 2017

(54) MANUFACTURING DEVICE AND MANUFACTURING METHOD FOR BATTERY

(71) Applicant: KABUSHIKI KAISHA TOSHIBA, Tokyo (JP)

(72) Inventor: Kenta Fukatsu, Fujisawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 513 days.

(21) Appl. No.: 13/804,041

(22) Filed: Mar. 14, 2013

(65) Prior Publication Data

US 2013/0247364 A1    Sep. 26, 2013

(30) Foreign Application Priority Data

Mar. 22, 2012   (JP) ................. 2012-065819

(51) Int. Cl.
| | | |
|---|---|---|
| H01M 2/36 | (2006.01) | |
| H01M 10/04 | (2006.01) | |
| H01M 10/0525 | (2010.01) | |

(52) U.S. Cl.
CPC ....... *H01M 10/0404* (2013.01); *H01M 2/361* (2013.01); *H01M 2/365* (2013.01); *H01M 10/0481* (2013.01); *H01M 10/0525* (2013.01); *Y10T 29/4911* (2015.01); *Y10T 29/49115* (2015.01); *Y10T 29/53135* (2015.01)

(58) Field of Classification Search
CPC ......... H01M 10/0404; H01M 10/0481; H01M 10/0525; H01M 2/365; Y10T 29/4911; Y10T 29/49115; Y10T 29/53135
USPC .................................. 429/74, 79, 80, 89
See application file for complete search history.

(56) References Cited

U.S. PATENT DOCUMENTS 6,465,121 B1    10/2002  Dawson et al.
2013/0312869 A1*  11/2013  Klien et al. ................ 141/7

FOREIGN PATENT DOCUMENTS

| DE | 102010052397.6 | * | 11/2010 | ............. H01M 2/36 |
| JP | 11-73942 | | 3/1999 | |
| JP | 2001-110401 A | | 4/2001 | |
| JP | 2004-247120 A | * | 9/2004 | ............. H01M 2/36 |
| JP | 2014-502410 | | 1/2014 | |
| KR | 10-2014-0004662 | | 1/2014 | |

OTHER PUBLICATIONS

Office Action issued Apr. 1, 2014 in Japanese Patent Application No. 2012-065819 (with English translation).

(Continued)

*Primary Examiner* — Patrick Ryan
*Assistant Examiner* — Ben Lewis
(74) *Attorney, Agent, or Firm* — Oblon, McClelland, Maier & Neustadt, L.L.P.

(57) ABSTRACT

According to one embodiment, a manufacturing device for a battery, includes, an electrolyte supply unit which introduces an electrolyte into a cell, a chamber which accommodates the battery cell, a first pressure adjustment unit configured to make a pressure in the battery cell lower than a pressure on the side of the electrolyte supply unit, and a second pressure adjustment unit configured to make a pressure outside the battery cell in the chamber lower than the pressure in the battery cell, thereby increasing the capacity of the battery cell.

16 Claims, 6 Drawing Sheets

(56) References Cited

OTHER PUBLICATIONS

Office Action issued Sep. 30, 2014 in Korean Patent Application No. 10-2013-27623 (with English translation).
Combined Chinese Office Action and Search Report issued Dec. 1, 2014 in Patent Application No. 201310085513.2 (with English language translation).
Office Action issued Jul. 24, 2015 in Chinese Patent Application No. 201310085513.2 (with English translation).

* cited by examiner

MANUFACTURING DEVICE AND MANUFACTURING METHOD FOR BATTERY

CROSS-REFERENCE TO RELATED APPLICATIONS

This application is based upon and claims the benefit of priority from Japanese Patent Application No. 2012-065819, filed Mar. 22, 2012, the entire contents of which are incorporated herein by reference.

FIELD

Embodiments described herein relate generally to a manufacturing device and manufacturing method for a battery.

BACKGROUND

Sealed secondary batteries, such as lithium-ion batteries, have become widely used for portable electronic apparatuses and the like. The sealed secondary batteries each comprise a battery cell, which comprises, for example, an open-topped metal container and a metal cell cap welded to the container so as to close its opening. Battery elements are located in the container before the cell cap is welded to the container, and thereafter, the cell cap is welded to the container to form the sealed battery cell. Then, an electrolyte is injected through an electrolyte injection hole into the battery cell by an electrolyte injection nozzle. After the electrolyte is thus injected, the injection hole is sealed with a seal lid.

A well-known secondary battery manufacturing device comprises an elastic electrolyte injection nozzle, vacuum pressure source, on-off valve, and electrolyte supply device. In this manufacturing device, the electrolyte injection nozzle is first brought into contact with the electrolyte injection hole, thereby sealing the injection hole from the outside. Then, the valve between the nozzle and vacuum pressure source is opened to decompress the cell. The valve is closed in a predetermined time or when vacuum pressure is reached. Further, the electrolyte supply device is actuated to inject a predetermined amount of electrolyte into the cell through the nozzle.

In a method using a hopper disposed on the top of an electrolyte injection nozzle, on the other hand, the hopper is placed on the cell so that the nozzle abuts the injection hole. If a necessary amount of electrolyte is injected into the hopper and introduced into a decompression chamber for pressure reduction, the cell is decompressed by means of the electrolyte. If the chamber is restored to atmospheric pressure, thereafter, the electrolyte in the hopper is urged to be injected into the cell by atmospheric pressure.

DETAILED DESCRIPTION

In general, according to one embodiment, a manufacturing device for a battery, comprises, an electrolyte supply unit which introduces an electrolyte into a cell, a chamber which accommodates the battery cell, a first pressure adjustment unit configured to make a pressure in the battery cell lower than a pressure on the side of the electrolyte supply unit, and a second pressure adjustment unit configured to make a pressure outside the battery cell in the chamber lower than the pressure in the battery cell, thereby increasing the capacity of the battery cell.

[First Embodiment]

A manufacturing device 20 and a manufacturing method for a sealed secondary battery 10 according to a first embodiment will now be described with reference to FIGS. 1 to 4. In these drawings, arrows X, Y and Z indicate three orthogonal directions, individually, and some structural elements are enlarged or reduced in scale or omitted for ease of illustration.

Figure 1:
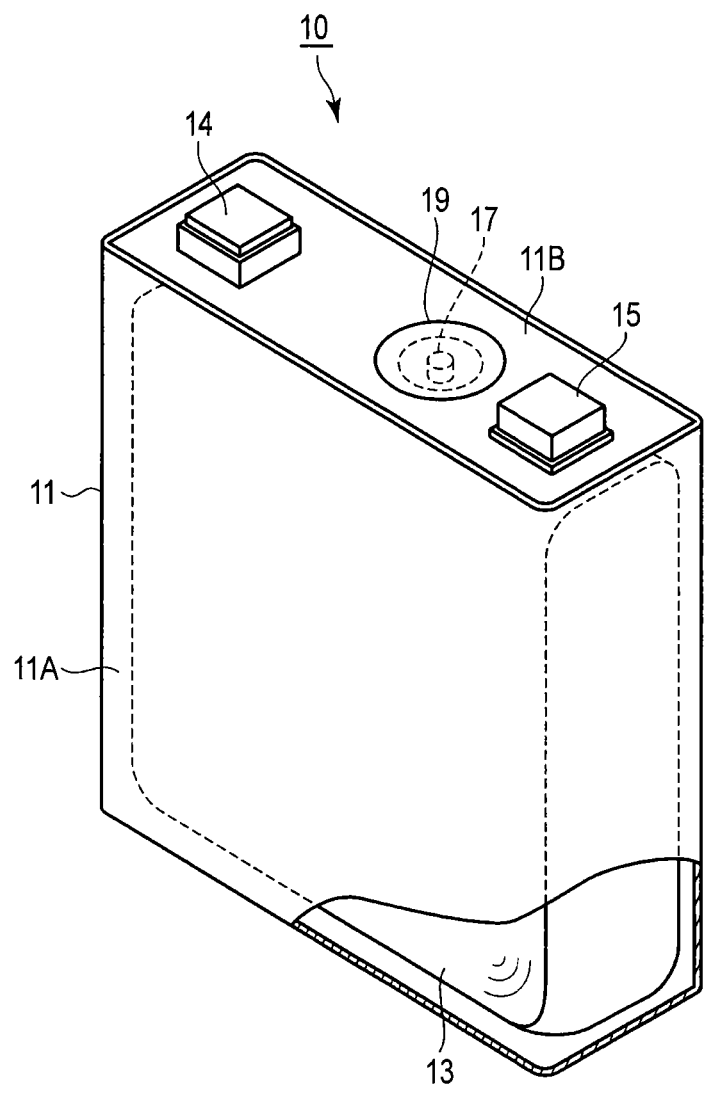
FIG. 1 is a cutaway perspective view showing a sealed secondary battery according to a first embodiment.

FIG. 1 is a cutaway perspective view showing the sealed secondary battery 10 according to the present embodiment. As shown in FIG. 1, the sealed secondary battery 10 comprises a flat box-like battery cell 11 made of metal, such as aluminum. An accommodating section formed inside the battery cell 11 accommodates a coil 13 along with an electrolyte.

The battery cell 11 comprises an open-topped container 11A and cell cap 11B in the form of a rectangular plate that seals the opening of the container 11A. The cell cap 11B is placed on and welded to the entire circumference of the opening end surface of the container 11A, thereby sealing the opening of the container 11A. Thus, the container 11A and cell cap 11B are integrated without a gap to form the sealed battery cell 11.

A positive electrode terminal 14 and negative electrode terminal 15 are arranged individually on the longitudinally opposite end portions of the cell cap 11B so that they individually project from the cell cap 11B. The positive electrode terminal 14 and negative electrode terminal 15 are connected to a positive electrode and negative electrode, respectively, of the coil 13. An explosion-proof valve is formed between the positive and negative electrode terminals 14 and 15 such that it is thin enough to be broken when the pressure in the battery is increased by production of gas.

An electrolyte injection hole 17 for injecting the electrolyte is formed through the central part of the cell cap 11B. The injection hole 17, which is, for example, circular, communicates the accommodating section of the battery cell 11 with outside the cell 11. The injection hole 17 is sealed by a seal lid 19 secured to the cell cap 11B.

The seal lid 19 is, for example, an aluminum disk, which is welded to the cell cap 11B by, for example, laser welding.

The coil 13 (electrode) is formed, for example, in such a flat shape that a positive electrode plate and negative electrode plate are spirally wound with an insulating separator between them and diametrically compressed.

The manufacturing device 20 and manufacturing method for the sealed secondary battery according to the present embodiment will now be described with reference to FIGS. 2 to 4.

The sealed secondary battery 10 is manufactured, for example, in such a manner that the coil 13 is accommodated in the container 11A, the cell cap 11B is welded to the container 11A to close its opening, the electrolyte is injected through the electrolyte injection hole 17, and the seal lid 19 is then welded so as to close the injection hole 17.

Figure 2:
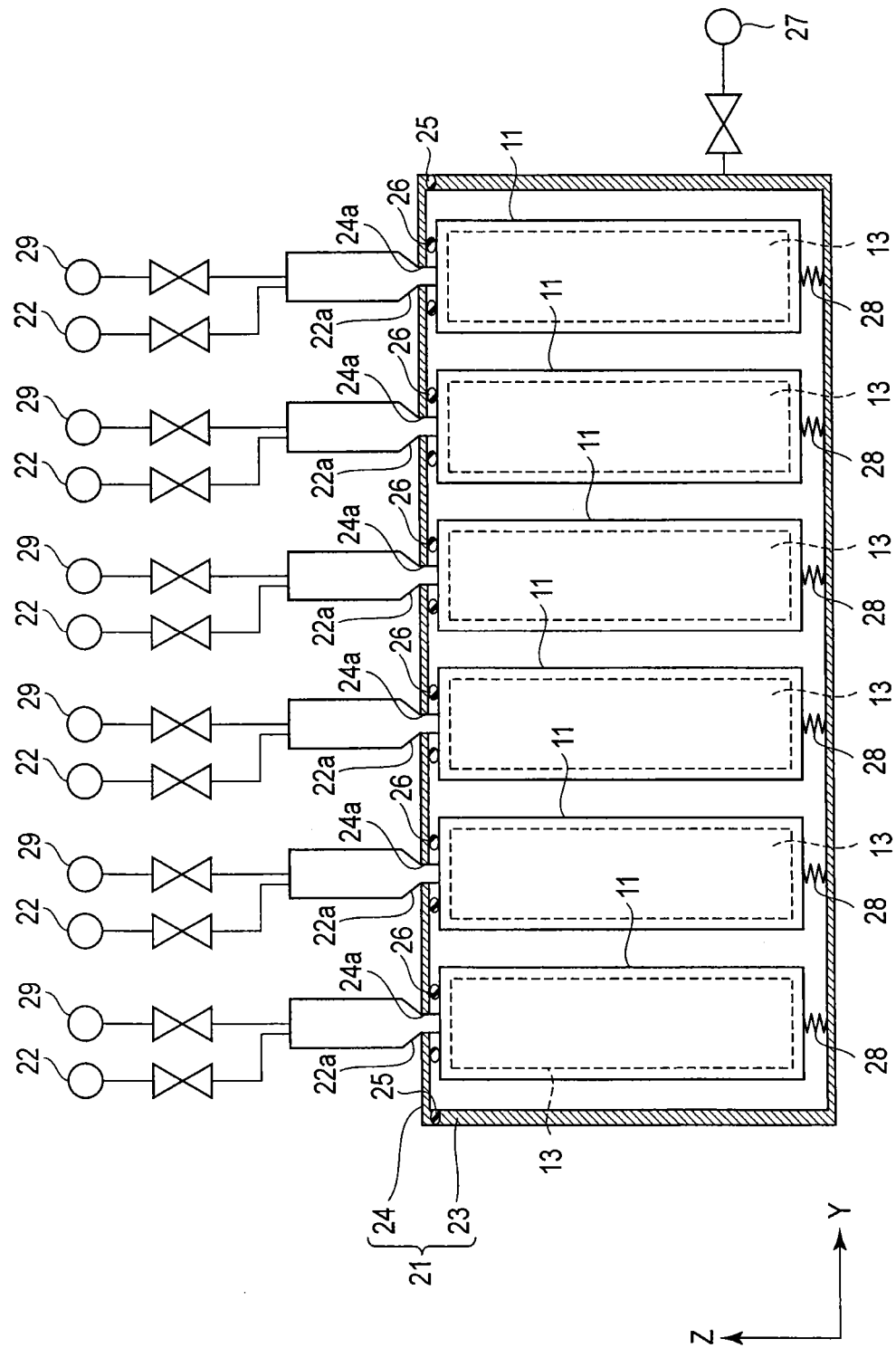
FIG. 2 is an explanatory diagram showing a manufacturing device for the sealed secondary battery.

FIG. 2 is an explanatory diagram showing the manufacturing device 20 for the secondary battery according to the present embodiment. A decompression chamber 21 is shown partially in section in FIG. 2. The manufacturing device 20 is an electrolyte injection device for injecting the electrolyte into the battery cells 11, and comprises the decompression chamber 21 accommodating the battery cells 11 and electrolyte supply units 22 for supplying the electrolyte.

The decompression chamber 21 comprises a case 23 in the form of an open-topped rectangular box and a cover 24 that closes the opening of the case 23. The decompression chamber 21 can accommodate the battery cells 11. The decompression chamber 21 comprises openings 24a, which allow the respective electrolyte injection holes 17 of the battery cells 11 and their surroundings to open to the outside. By way of example, the decompression chamber 21 accommodates six battery cells 11 arranged side by side. The openings 24a are formed individually in those parts of the cover 24 located corresponding to the respective injection holes 17 of the battery cells 11.

An elastic seal member 25 for hermetic closure is interposed between the cover 24 and an open edge of the case 23 such that the decompression chamber 21 can be hermetically closed. Further, an elastic O-ring 26 is disposed around each opening 24a. As each battery cell 11 is pressed against its corresponding O-ring 26, the entire region around the opening 24a and electrolyte injection hole 17 is sealed in an airtight manner. In this case, an urging mechanism 28, such as a spring, which urges each battery cell 11 upward to close the region around the opening 24a, can be disposed at the bottom of the decompression chamber 21, as shown in FIG. 2. The urging mechanism 28 presses the battery cell 11 against the O-ring 26, thereby hermetically sealing the entire region around the injection hole 17 of the cell 11.

Alternatively, the battery cell 11 may be arranged so that it can be pressed against the elastic O-ring 26 to flatten it, based on predetermined dimensional control, without using a spring or other urging means. Also in this case, the entire region around the electrolyte injection hole 17 of the battery cell 11 can be sealed in an airtight manner.

A decompression device 27 for use as a second decompression unit is connected to the decompression chamber 21. Decompression device 27 comprises a suction mechanism, such as a vacuum pump, which draws in gas from the decompression chamber 21, thereby adjusting the pressure in the chamber 21.

Each electrolyte supply unit 22 comprises a supply tank capable of holding the electrolyte and communicates with an electrolyte injection nozzle 22a through an opening/closing mechanism, such as a valve. The supply tank is open to the atmosphere. The electrolyte supply unit 22 has the function of introducing a predetermined amount of electrolyte into the battery cell 11 through the injection nozzle 22a.

The electrolyte injection nozzle 22a abuts the inside of the electrolyte injection hole 17 of the battery cell 11 through the opening 24a and is sealed. The injection nozzle 22a is connected to a decompression device 29 as a first decompression unit, as well as to the electrolyte supply unit 22 for electrolyte supply.

Decompression device 29 comprises a suction mechanism, such as a vacuum pump, and internally communicates with the battery cell 11 through the electrolyte injection nozzle 22a. The pressure in the battery cell 11 is adjusted by drawing in the gas from the cell 11 through the injection nozzle 22a and injection hole 17 by means of decompression device 29. Thus, in this embodiment, decompression devices 29 and 27 function as first and second pressure adjustment units, respectively.

An electrolyte injection and an impregnation using this secondary battery manufacturing device 20 will be described with reference to FIGS. 3 and 4. As shown in FIGS. 2 and 3, the battery cell 11 that accommodates the coil 13 is disposed in the decompression chamber 21 of the manufacturing device 20. Further, the electrolyte injection nozzle 22a abuts the electrolyte injection hole 17 of the battery cell 11 so that the electrolyte supply unit 22 and decompression device 29 communicate with the cell 11. In this arrangement, the region around the injection hole 17 is sealed in an airtight manner as the cell 11 is pressed against the O-ring 26 by the urging mechanism 28.

Figure 3:
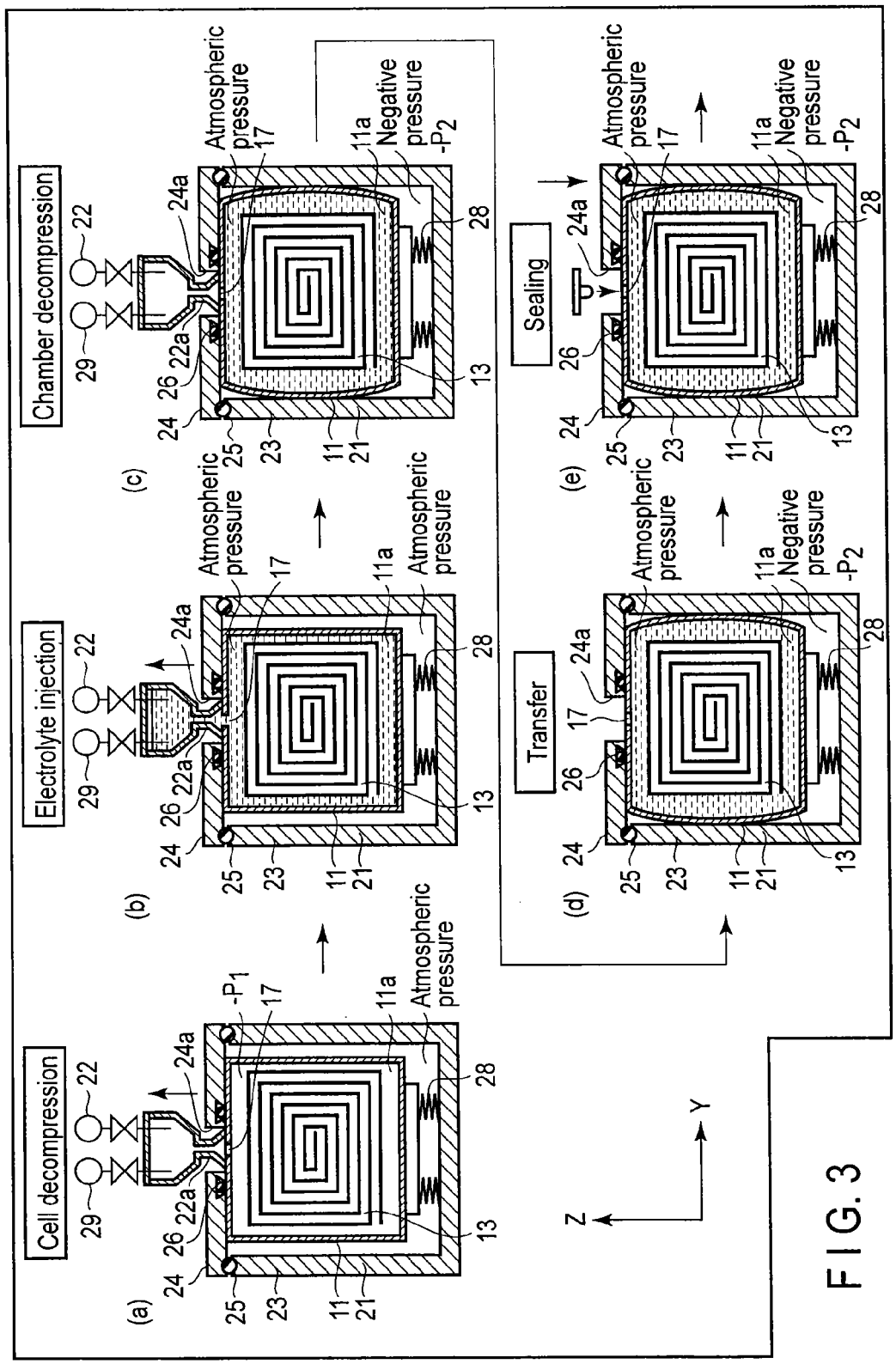
FIG. 3 is an explanatory diagram showing a manufacturing method for the sealed secondary battery.

In this state, the pressure in the battery cell 11 is reduced through the electrolyte injection nozzle 22a by decompression device 29, as shown in <a> of FIG. 3. Thereupon, the pressure in the cell 11 is made lower than that in the supply tank, thereby creating a pressure difference (cell decompression). In this embodiment, a pressure P0 in the supply unit 22 is equal to atmospheric pressure, and the pressure in the cell 11 is adjusted to a negative pressure (−P1).

Then, the valve is opened, and a predetermined amount of electrolyte is supplied through the electrolyte injection nozzle 22a by the supply unit 22 (electrolyte injection), as shown in <b> of FIG. 3. Thereupon, electrolyte injection from the electrolyte supply unit 22 is promoted by the pressure difference, and a certain amount of electrolyte corresponding to the capacity of a vacant space 11a in the battery cell 11 is injected in several seconds. Since impregnation of the coil 13 is not advanced at this point in time, some of the electrolyte equivalent to the difference between a necessary amount and the certain amount corresponding to the capacity of the vacant space 11a remains in the supply unit 22, as shown in <b> of FIG. 3. The pressure in the battery cell 11 is equalized to that in the supply unit 22, that is, atmospheric pressure, by the electrolyte injection.

Subsequently, the decompression chamber 21 is decompressed by decompression device 27, whereby the pressure outside the battery cell 11 in the decompression chamber 21 is made lower than that in the cell 11 so that the cell 11 is expanded or increased in capacity by the pressure difference (chamber decompression), as shown in <c> of FIG. 3.

Since the pressure in the battery cell 11 is then equal to atmospheric pressure, as described above, a pressure difference is created by adjusting the pressure outside the cell 11 in the decompression chamber 21 to a negative pressure (−P2).

The pressure in the decompression chamber 21 is determined based on the capacity and elastic deformation characteristics of the battery cell 11 and the amount of impregnation of the electrolyte. Preferably, this pressure should be set within the tolerance of deformation of the cell 11 and so that the necessary amount of impregnation is exceeded by the amount corresponding to the capacity of the vacant space of the cell. The minimum necessary expansion of the cell can be obtained by thus controlling the reduced pressure to be within a necessary range.

The battery cell 11 is expanded by the pressure difference created by this decompression, so that the capacity of the vacant space 11a in the cell 11 increases. Specifically, the difference between the pressures in and outside the battery cell 11 is created to increase the volume of the electrolyte accommodated in the cell 11, whereby a a rest of the electrolyte exceeding the certain amount can be injected.

Thus, the predetermined amount of electrolyte with which the coil 13 is to be impregnated is ready to be accommodated in the vacant space 11a in the cell 11 outside the coil 13. Accordingly, the electrolyte remaining in the electrolyte injection nozzle 22a is injected into the cell 11.

After the injection is completed, the decompression chamber 21 is transferred from an injection position, as shown in <d> of FIG. 3, and the seal lid 19 is fitted into the electrolyte injection hole 17, thereby sealing the battery cell 11, as shown in <e> of FIG. 3.

Figure 4:
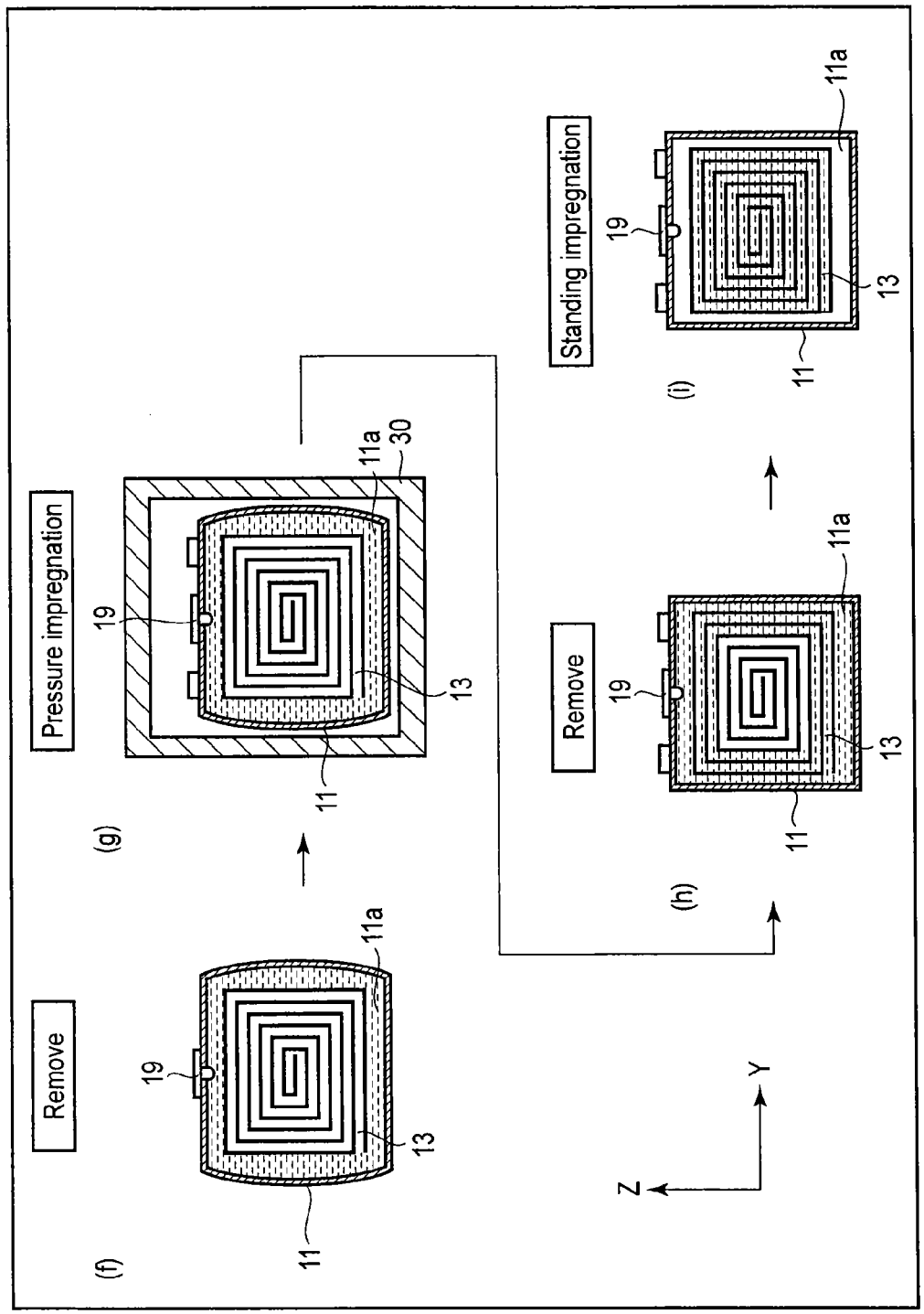
FIG. 4 is an explanatory diagram showing the manufacturing method for the sealed secondary battery.

After the sealing, the battery cell 11 is removed from the decompression chamber 21, as shown in <f> of FIG. 4.

As shown in <g> of FIG. 4, moreover, the battery cell 11 is put into a pressure device 30 and entirely pressurized, whereupon the coil 13 is impregnated with the electrolyte in the cell 11 (pressure impregnation). When this is done, the pressure in the cell 11 is increased by, for example, applying a predetermined pressure to the cell 11 by means of the pressure device. The impregnation of the coil 13 with the electrolyte in the vacant space in the cell 11 is promoted by this pressurization.

Thereafter, the battery cell 11 is removed from the pressure device 30, as shown in <h> of FIG. 4, and is left to stand so that the coil 13 is fully impregnated with the electrolyte (standing impregnation). As the expanded cell 11 is impregnated in this manner, the capacity of the vacant space 11a is reduced so that the cell 11 is restored to its original shape.

According to the secondary battery manufacturing method and device of the present embodiment, the electrolyte can be rapidly injected into the cell even with use of a slow-impregnation material. Thus, a highly productive production line can be constructed without using a large number of electrolyte injection devices.

In a device and method in which coils are impregnated with an electrolyte in an electrolyte injection device as electrolyte injection is performed with the injection device connected to cells, for example, the electrolyte injection and impregnation require several tens of hours. According to the embodiment described above, the electrolyte injection is performed rapidly through the pressure adjustment, and each battery cell is expanded so that the capacity of the vacant space therein can be increased before the completion of the impregnation, whereby the necessary amount can be injected.

Thus, the electrolyte injection can be completed in, for example, several tens of seconds or even several seconds so that the impregnation can be performed after the completion of the injection and sealing. Thus, the processing time and yield cycle time can be considerably reduced.

If a plastic separator and high-viscosity electrolyte are used, in particular, the electrolyte injection and impregnation require long time, resulting in a reduction in productivity. According to the battery manufacturing device and method of the present embodiment, however, the electrolyte injection and impregnation can be performed at high speed, so that the productivity can be improved. Since this performance can be achieved by only adjusting the pressures in and outside the cells 11, moreover, the device configuration and processing procedure can be simplified.

Figure 5:
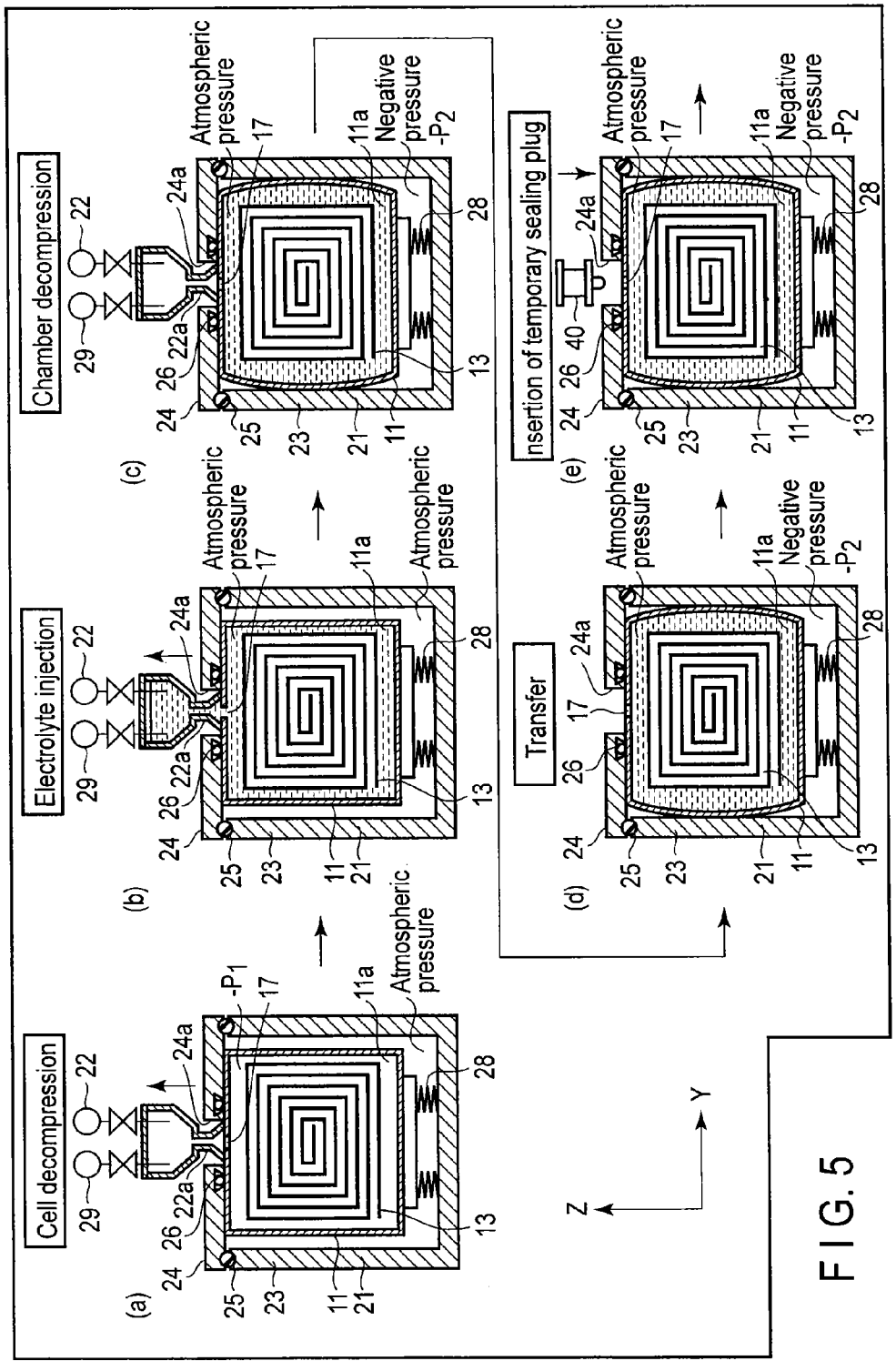
FIG. 5 is an explanatory diagram showing a manufacturing method for a sealed secondary battery according to another embodiment.

In the above-described embodiment, the impregnation is performed after sealing with the seal lid 19 after the completion the necessary-amount injection. In an alternative embodiment shown in FIGS. 5 and 6, however, a detachable temporary sealing plug 40 (a first seal lid) is inserted into an electrolyte injection hole to perform temporary sealing, as shown in <e> of FIG. 5, after the electrolyte is injected and the cell capacity is increased in the same manner as in the first embodiment, as shown in <a> to <d> of FIG. 5. An elastic plug is used as the temporary sealing plug 40.

Figure 6:
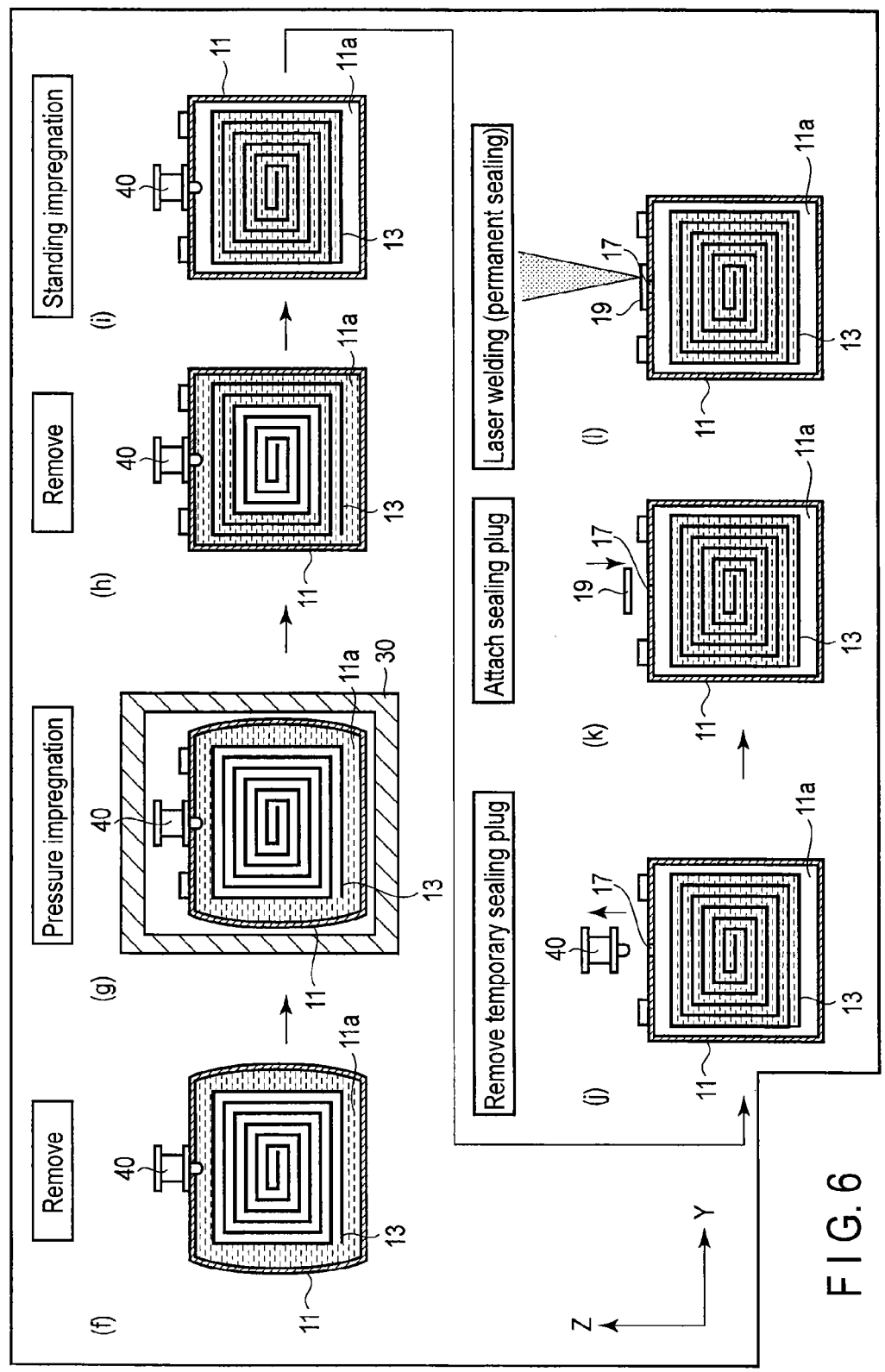
FIG. 6 is an explanatory diagram showing the manufacturing method for the sealed secondary battery.

The temporary sealing plug 40 is removed, as shown in <j> of FIG. 6, after the pressure impregnation and standing impregnation are performed in the same manner as in the first embodiment, as shown in <f> to <i> of FIG. 6. Further, the seal lid 19 (a second seal lid) is mounted on the electrolyte injection hole 17, as shown in <k> of FIG. 6, and laser welding is performed, as shown in <l> of FIG. 6, whereupon the injection hole 17 is sealed.

The same effect as in the first embodiment can also be obtained in this embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A manufacturing method for a battery, comprising:
connecting an electrolyte supply unit for electrolyte supply to an electrolyte injection hole formed in a battery cell and injecting the electrolyte into the battery cell with a pressure in the battery cell kept lower than a pressure on the side of the electrolyte supply unit; and
increasing the capacity of the battery cell by reducing a pressure outside the battery cell to be lower than the pressure in the battery cell when the battery cell is disposed in the chamber.

2. The manufacturing method for a battery of claim 1, wherein the increasing the capacity of the battery cell is performed simultaneously with or after the injecting the electrolyte into the battery cell.

3. The manufacturing method for a battery of claim 1, the injecting the electrolyte into the battery cell and the increasing the capacity of the battery cell are performed in a decompression chamber accommodating the battery cell and capable of being decompressed.

4. The manufacturing method for a battery of claim 3, wherein a pressure difference is created between the pressures on the side of the electrolyte supply unit and in the battery cell by decompressing the battery cell, whereby electrolyte injection from the electrolyte supply unit is promoted so that a certain amount of electrolyte is injected, in the injecting the electrolyte into the battery cell, and the capacity of the battery cell is increased to increase the volume of the electrolyte accommodated in the battery cell by decompressing the decompression chamber.

5. The manufacturing method for a battery of claim 4, wherein the pressure in the decompression chamber is determined based on the deformation characteristics of the battery cell and the amount of the electrolyte injected into the battery cell.

6. The manufacturing method for a battery of claim 1, wherein sealing the battery cell with a first seal lid capable of being attached to and detached from the electrolyte injection hole, impregnating the battery cell sealed with the first seal lid with the electrolyte, and removing the first seal lid and sealing the electrolyte injection hole with a second seal lid after the electrolyte impregnation are performed after the injecting the electrolyte into the battery cell and the increasing the capacity of the battery cell are performed.

7. The manufacturing method for a battery of claim 1, wherein the battery cell into which the electrolyte is injected is pressurized so that a coil is impregnated with the electrolyte.

8. The manufacturing method for a battery of claim 1, wherein the electrolyte supply unit is configured such that electrolyte remains when the certain amount of electrolyte is introduced into the battery cell.

9. The manufacturing method for a battery of claim 1, wherein
the injecting includes injecting a certain amount of electrolyte corresponding to a capacity of a vacant space in the battery cell from the electrolyte supply unit by a pressure difference by causing a first pressure adjustment unit to keep the pressure in the battery cell lower than the pressure on the side of the electrolyte supply unit, and p1 the increasing includes increasing the capacity of the battery cell by a pressure difference by causing a second pressure adjustment unit to make a pressure outside the battery cell lower than the pressure in the battery cell so as to accommodate a predetermined amount of the electrolyte exceeding the certain amount, and injecting a rest of the electrolyte into the battery cell.

10. A manufacturing method for a battery, comprising:
connecting an electrolyte supply unit for electrolyte supply to an electrolyte injection hole formed in a battery cell and injecting the electrolyte into the battery cell with a pressure in the battery cell kept lower than a pressure on the side of the electrolyte supply unit; and
increasing the capacity of the battery cell by reducing a pressure outside the battery cell to be lower than the pressure in the battery cell when the battery cell is disposed in the chamber,
wherein sealing the battery cell with a first seal lid capable of being attached to and detached from the electrolyte injection hole, impregnating the battery cell sealed with the first seal lid with the electrolyte, and removing the first seal lid and sealing the electrolyte injection hole with a second seal lid after the electrolyte impregnation are performed after the injecting the electrolyte into the battery cell and the increasing the capacity of the battery cell are performed.

11. The manufacturing method for a battery of claim 10, wherein the electrolyte supply unit is configured such that electrolyte remains when the certain amount of electrolyte is introduced into the battery cell.

12. The manufacturing method for a battery of claim 10, wherein the increasing the capacity of the battery cell is performed simultaneously with or after the injecting the electrolyte into the battery cell.

13. The manufacturing method for a battery of claim 10, the injecting the electrolyte into the battery cell and the increasing the capacity of the battery cell are performed in a decompression chamber accommodating the battery cell and capable of being decompressed.

14. The manufacturing method for a battery of claim 13, wherein a pressure difference is created between the pressures on the side of the electrolyte supply unit and in the battery cell by decompressing the battery cell, whereby electrolyte injection from the electrolyte supply unit is promoted so that the certain amount of electrolyte is injected, in the injecting the electrolyte into the battery cell, and the capacity of the battery cell is increased to increase the volume of the electrolyte accommodated in the battery cell by decompressing the decompression chamber.

15. The manufacturing method for a battery of claim 14, wherein the pressure in the decompression chamber is determined based on the deformation characteristics of the battery cell and the amount of the electrolyte injected into the battery cell.

16. The manufacturing method for a battery of claim 10, wherein the battery cell into which the electrolyte is injected is pressurized so that a coil is impregnated with the electrolyte.

* * * * *